United States Patent
Lyubomirsky et al.

(10) Patent No.: US 9,385,815 B2
(45) Date of Patent: *Jul. 5, 2016

(54) BANDWIDTH EFFICIENT DUAL CARRIER

(71) Applicant: FINISAR CORPORATION, Sunnyvale, CA (US)

(72) Inventors: Ilya Lyubomirsky, Pleasonton, CA (US); Yasuhiro Matsui, Milpitas, CA (US); Daniel Mahgerefteh, Los Angeles, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,782

(22) Filed: Feb. 9, 2015

(65) Prior Publication Data

US 2015/0215047 A1 Jul. 30, 2015

Related U.S. Application Data

(63) Continuation of application No. 13/454,290, filed on Apr. 24, 2012, now Pat. No. 8,953,947.

(51) Int. Cl.
| | |
|---|---|
| *H04B 10/04* | (2006.01) |
| *H04B 10/00* | (2013.01) |
| *H04B 10/06* | (2006.01) |
| *H04B 10/532* | (2013.01) |
| *H04J 14/06* | (2006.01) |

(52) U.S. Cl.
CPC .............. *H04B 10/532* (2013.01); *H04J 14/06* (2013.01)

(58) Field of Classification Search
CPC .............................. H04B 10/532; H04J 14/06
USPC .................................. 398/184, 152, 185, 205
See application file for complete search history.

(56) References Cited

U.S. PATENT DOCUMENTS

| | | | |
|---|---|---|---|
| 7,076,169 B2 * | 7/2006 | Shpantzer | H04B 10/2543 398/152 |
| 7,266,310 B1 | 9/2007 | Savory et al. | |
| 7,486,897 B2 * | 2/2009 | Kim | H04B 10/505 356/364 |

(Continued)

OTHER PUBLICATIONS

Sanjoh, H.; Yamada, E.; Yoshikuni, Y., "Optical orthogonal frequency division multiplexing using frequency/time domain filtering for high spectral efficiency up to 1 bit/s/Hz," in Optical Fiber Communication Conference and Exhibit, 2002. Ofc 2002 , vol., No., pp. 401-402, Mar. 17-22, 2002.*

(Continued)

*Primary Examiner* — Ken N Venderpuye
*Assistant Examiner* — Abbas H Alagheband
(74) *Attorney, Agent, or Firm* — Maschoff Brennan

(57) ABSTRACT

In some examples, a transmit assembly is described that may include a first optical transmitter, a second optical transmitter, and a polarizing beam combiner. The first optical transmitter may be configured to emit a first optical data signal centered at a first frequency. The second optical transmitter may be configured to emit a second optical data signal centered at a second frequency offset from the first frequency by a nominal offset n. The polarizing beam combiner may be configured to generate a dual carrier optical data signal by polarization interleaving the first optical data signal with the second optical data signal. An output of the polarizing beam combiner may be configured to be communicatively coupled via an optical transmission medium to a polarization-insensitive receive assembly.

24 Claims, 13 Drawing Sheets

(56) References Cited

U.S. PATENT DOCUMENTS

| | | | | |
|---|---|---|---|---|
| 7,813,648 | B2* | 10/2010 | Mahgerefteh | G02B 5/281 398/158 |
| 8,306,418 | B2* | 11/2012 | Cai | H04B 10/677 398/147 |
| 8,401,398 | B2* | 3/2013 | Robinson | H04B 10/5051 398/183 |
| 8,401,402 | B2* | 3/2013 | Cai | H04J 14/02 398/159 |
| 8,958,697 | B2* | 2/2015 | Soto | H04B 10/2503 398/100 |
| 2009/0016740 | A1* | 1/2009 | Mahgerefteh | G02B 5/281 398/158 |
| 2010/0104277 | A1* | 4/2010 | Robinson | G04B 10/5051 398/25 |
| 2010/0232796 | A1* | 9/2010 | Cai | G04B 10/677 398/79 |
| 2010/0232797 | A1* | 9/2010 | Cai | H04J 14/02 398/79 |
| 2012/0275784 | A1* | 11/2012 | Soto | G04B 10/2503 398/38 |

OTHER PUBLICATIONS

R. R Tripathi, R. Gangwar, and N. Singh, "Reduction of crosstalk in wavelength division multiplexed fiber optic communication systems," Progress in Electromagnetics Research, vol. 77, 367-378, 2007.*

Sanjoh, H.; Yamada, E.; Yoshikuni, Y., "Optical orthogonal frequency division multiplexing using frequency/time domain filtering for high spectral efficiency up to 1 bit/s/Hz," in Optical Fiber Communication Conference and Exhibit, 2002. OFC 2002 , vol., No., pp. 401-402, 17-22 Mar. 17-22, 2002.*

R. Tripathi, R. Gangwar, and N. Singh, "Reduction of crosstalk in wavelength division multiplexed fiber optic communication systems," Progress in Electromagnetics Research, vol. 77, 367-378, 2007.*

Bobrovs V. et al., "Influence of Nonlinear Optical Effects on the NRZ and RZ Modulation Signals in WDM Systems", Electronics and Electrical Engineering, 2007, No. 4(76), pp. 55-58.

Tripathi R. et al., "Reduction of Crosstalk in Wavelength Division Multiplexed Fiber Optic Communication Systems," Progress in Electromagnetics Research, 2007, vol. 77, pp. 367-378.

* cited by examiner

BANDWIDTH EFFICIENT DUAL CARRIER

CROSS-REFERENCE TO RELATED APPLICATIONS

This patent application is a continuation of U.S. patent application Ser. No. 13/454,290, filed Apr. 24, 2012, which is incorporated herein by reference.

BACKGROUND

1. Field of the Invention

Embodiments described herein generally relate to bandwidth efficient optical data transmission. More particularly, some example embodiments relate to optical data communication using polarization interleaved dual carrier optical data signals that are demultiplexed without performing polarization demultiplexing.

2. Related Technology

Some optical communication systems, such as wavelength division multiplexing (WDM) systems, transmit multiple optical data signals over a shared transmission medium, such as an optical fiber, by transmitting each optical data signal over a different frequency (or wavelength) channel. For instance, some WDM systems may have channels spaced at 50 gigahertz (GHz), 25 GHz, or the like. To avoid or limit cross-talk between signals propagating in the same transmission medium, the channel spacing, or frequency offset, of optical data signals on adjacent frequency channels is typically greater than the symbol rate of each of the optical data signals. For instance, two 25 gigabaud per second (GBd/s) optical data signals typically have a frequency offset of at least 25 GHz.

Some optical communication systems may instead transmit multiple, e.g., two, optical data signals in a shared transmission medium and at the same frequency by providing the two optical data signals with orthogonal polarizations, thereby reducing interference. However, such systems require bulky, expensive, and/or power-consuming components at the receiver that can perform polarization demultiplexing to separate the two optical data signals from each other for further independent processing.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

Some example embodiments relate to optical data communication using polarization interleaved dual carrier optical data signals that are demultiplexed without performing polarization demultiplexing.

In some examples, a transmit assembly is described that may include a first optical transmitter, a second optical transmitter, and a polarizing beam combiner. The first optical transmitter may be configured to emit a first optical data signal centered at a first frequency. The second optical transmitter may be configured to emit a second optical data signal centered at a second frequency offset from the first frequency by a nominal offset n. The polarizing beam combiner may be configured to generate a dual carrier optical data signal by polarization interleaving the first optical data signal with the second optical data signal. An output of the polarizing beam combiner may be configured to be communicatively coupled via an optical transmission medium to a polarization-insensitive receive assembly.

In some examples, a receive assembly is described that may include a polarization-insensitive demultiplexer, a first optical transmitter, and a second optical transmitter. The polarization-insensitive demultiplexer may be configured to receive and demultiplex a polarization interleaved dual carrier optical data signal into a first optical data signal centered at a first frequency and a second optical data signal centered at a second frequency offset from the first frequency by a nominal offset n. The first optical receiver may be configured to receive the first optical data signal and to generate a first electrical data signal representing the first optical data signal. The second optical receiver may be configured to receive the second optical data signal and to generate a second electrical data signal representing the second optical data signal.

In some examples, an optoelectronic module is described that may include a transmit assembly and a polarization-insensitive receive assembly. The transmit assembly may be configured to generate a first dual carrier optical data signal including a first optical data signal centered at a first frequency and a second optical data signal centered at a second frequency offset from the first frequency by a nominal offset n. The first optical data signal may be polarization interleaved with the second optical data signal. The polarization-insensitive receive assembly may be configured to receive and demultiplex, without performing polarization demultiplexing, a second dual carrier optical data signal including a third optical data signal polarization interleaved with a fourth optical data signal.

In some examples, a method is described. The method may include generating a first optical data signal centered at a first frequency. The method may also include generating a second optical data signal centered at a second frequency offset from the first frequency by a nominal offset n. The method may also include polarization multiplexing the first optical data signal with the second optical data signal to generate a dual carrier optical data signal. The method may also include coupling the dual carrier optical data signal onto an optical transmission medium communicatively coupled to a polarization-insensitive receive assembly configured to demultiplex the dual carrier optical data signal without performing polarization demultiplexing.

In some examples, a method is described. The method may include receiving a polarization interleaved dual carrier optical data signal. The method may also include demultiplexing, without performing polarization demultiplexing, the dual carrier optical data signal into a first optical data signal centered at a first frequency and a second optical data signal centered at a second frequency offset from the first frequency by a nominal offset n. The method may also include generating a first electrical data signal representing the first optical data signal. The method may also include generating a second electrical data signal representing the second optical data signal.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein generally relate to bandwidth efficient optical data transmission using a polarization interleaved dual carrier optical data signal that is demultiplexed without performing polarization demultiplexing. According to some embodiments, a first optical transmitter emits a first optical data center centered at a first frequency. A second optical transmitter emits a second optical data center centered at a second frequency offset from the first frequency by a nominal offset n. A polarizing beam combiner polarization interleaves the first and second optical data signals to generate a dual carrier optical data signal. By polarization interleaving the first and second optical data signals, the nominal offset n may be reduced to an amount less than a symbol rate s of each of the first and second optical data signals, while the orthogonal polarizations of the first and second optical data signals suppress interference such as cross-talk.

The dual carrier optical data signal may be received and processed by a polarization-insensitive receiver. In particular, a polarization-insensitive demultiplexer receives and demultiplexes the dual carrier optical data signal into the first and second optical data signals by discriminating according to frequency. A first optical receiver receives the first optical data signal and generates a first electrical signal representing the first optical data signal. A second optical receiver receives the second optical data signal and generates a second electrical signal representing the second optical data signal. By demultiplexing the polarization interleaved dual carrier optical data signal based on frequency rather than polarization, the bulky, expensive, and/or power-consuming components typically used to perform polarization demultiplexing may be eliminated.

Figure 1:
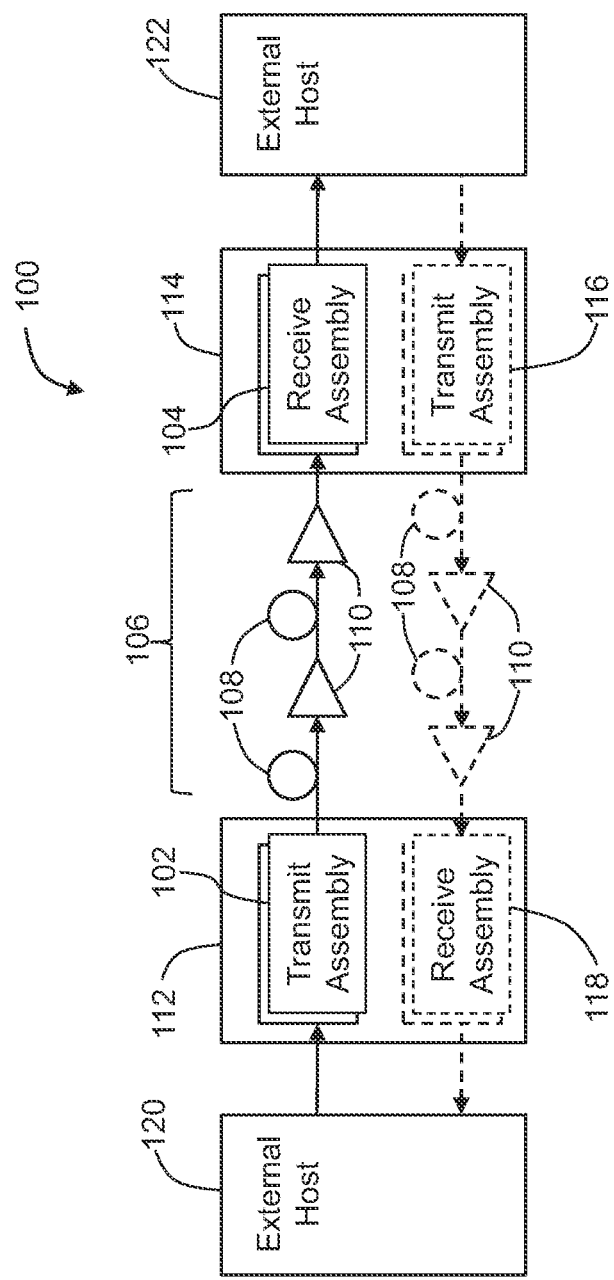
FIG. 1 illustrates an example optical communication system in which some embodiments described herein may be implemented.

FIG. 1 illustrates an example optical communication system 100 in which some embodiments described herein may be implemented. The optical communication system 100 includes one or more first transmit assemblies 102 and one or more first receive assemblies 104 communicatively coupled via optical transmission media 106 to thereby form an optical communication link. The optical transmission media 106 may include, for example, one or more optical fibers 108 and/or one or more dispersion compensating elements 110 to compensate for dispersion within the optical fibers 108.

In some embodiments, the one or more first transmit assemblies 102 may be incorporated within a first optoelectronic module 112 while the one or more first receive assemblies 104 may be incorporated within a second optoelectronic module 114. Although not required, each of the first and second optoelectronic modules 112, 114 may be compliant with a suitable multi-source agreement (MSA), such as, but not limited to, the Quad Small Form-factor Pluggable (QSFP+) MSA, the C form-factor pluggable (CFP) MSA, or other suitable MSA.

Optionally (as denoted by dashed lines), the second optoelectronic module 114 may additionally include one or more second transmit assemblies 116 communicatively coupled via optical transmission media 106 to one or more second receive assemblies 118 of the first optoelectronic module 112. As used herein, the terms "first," "second," "third," etc. are not intended to designate any sort of order unless context dictates otherwise, but rather are simply used to distinguish between various components.

FIG. 1 additionally illustrates that each of the first and second optoelectronic modules 112, 114 may be communicatively coupled to an external host 120, 122. The first and second optoelectronic modules may generally be configured to convert between electrical and optical domains. In particular, electrical data signals received from one of the external hosts 120, 122 at the first or second optoelectronic module 112, 114 may be converted to optical data signals by a corresponding one of the first or second transmit assemblies 102, 116 and communicated optically via optical transmission media 106 to a corresponding one of the first or second receive assemblies 104, 118. The first and second receive assemblies 104, 118 may then convert the optical data signals back to electrical data signals and provide the electrical data signals to a corresponding one of the external hosts 120, 122.

The optical data signals communicated over optical transmission media 106 may include dual carrier optical data signals in some embodiments. More particularly, each of the one or more first transmit assemblies 102 and each of the one or more second transmit assemblies 116 may be configured to generate two optical data signals centered at frequencies offset from each other by a nominal offset n, and to polarization interleave the two optical data signals to generate a dual carrier optical data signal. The dual carrier optical data signal generated by each first or second transmit assembly 102, 116 may be transmitted via the optical transmission media 106 to a corresponding one of the first or second receive assemblies 104, 118.

Each of the one or more first receive assemblies 104 and each of the one or more second receive assemblies 118 may be configured to receive a dual carrier optical data signal from a corresponding one of the second or first transmit assemblies 116. As already noted above, the dual carrier optical data signals may be polarization interleaved. Moreover, each of the first and second receive assemblies 104, 118 may be configured to demultiplex, without performing polarization demultiplexing, the corresponding dual carrier optical data signal into two optical data signals centered at frequencies offset from each other by the nominal offset n. As such, each of the first and second receive assemblies 104, 118 may be referred to as a polarization insensitive receive assembly. By polarization insensitivity, it is meant that the first and second receive assemblies 104, 118 do not discriminate optical data signals of different polarizations.

Although not illustrated in FIG. 1, the optical communication system 100 may additionally include one or more multiplexers at the output of the one or more first transmit assemblies 102 and at the output of the one or more second transmit assemblies 116. The multiplexers may be configured to multiplex multiple dual carrier optical data signals onto a single optical fiber 108. Alternately or additionally, the optical communication system 100 may additionally include one or more demultiplexers at the input of the one or more first receive assemblies 104 and at the input of the one or more second receive assemblies 118. The demultiplexers may be configured to demultiplex a multiplexed optical data signal into multiple dual carrier optical data signals, each provided to a different one of the one or more first receive assemblies 104 and the one or more second receive assemblies 118.

Figure 2:
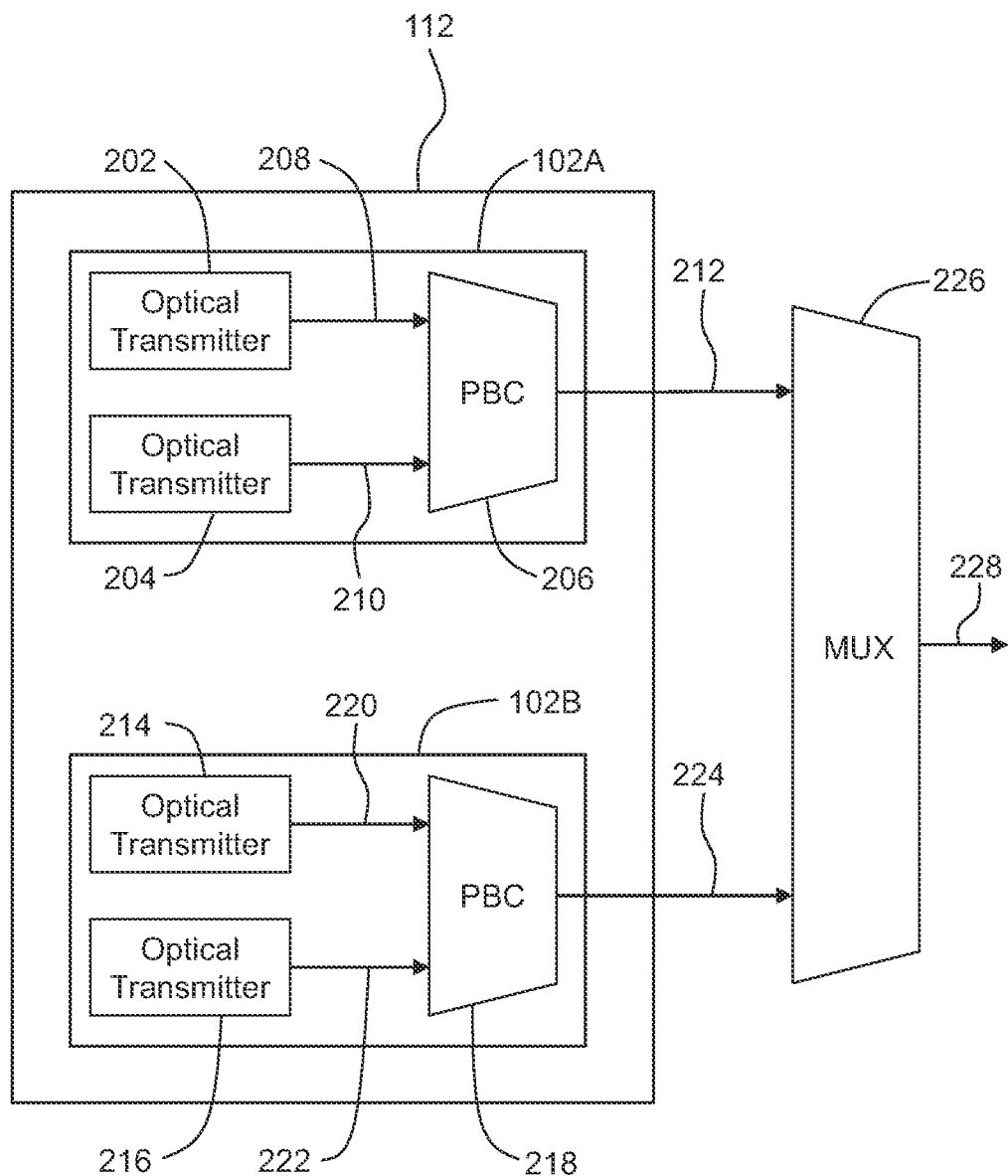
FIG. 2 illustrates an example embodiment of an optoelectronic module that may be implemented in the optical communication system of FIG. 1.

FIG. 2 illustrates an example embodiment of the first optoelectronic module 112. In the illustrated embodiment, the first optoelectronic module 112 includes transmit assemblies 102A, 102B, corresponding to the one or more first transmit assemblies 102 of FIG. 1.

The transmit assembly 102A includes first and second optical transmitters 202, 204 and a polarizing beam combiner (PBC) 206. The first optical transmitter 202 may be configured to emit a first optical data signal 208 centered at a first frequency $f_1$. The second optical transmitter 204 may be configured to emit a second optical data signal 210 centered at a second frequency $f_2$ offset from the first frequency $f_1$ by the nominal offset n. The PBC 206 may be configured to generate a dual carrier optical data signal 212 by polarization interleaving the first optical data signal 208 with the second optical data signal 210 such that the first and second optical data signals 208, 210 have orthogonal polarizations in the dual carrier optical data signal 212.

Similarly, the transmit assembly 102B includes third and fourth optical transmitters 214, 216 and a PBC 218. The third optical transmitter 214 may be configured to emit a third optical data signal 220 centered at a third frequency $f_3$. The fourth optical transmitter 216 may be configured to emit a fourth optical data signal 222 centered at a fourth frequency $f_4$ offset from the third frequency $f_3$ by the nominal offset n. The PBC 218 may be configured to generate a dual carrier optical data signal 224 by polarization interleaving the third optical data signal 220 with the fourth optical data signal 222 such that the third and fourth optical data signals 220, 222 have orthogonal polarizations in the dual carrier optical data signal 224.

Outputs of each of the PBC 206 and the PBC 218 may be communicatively coupled via an optical transmission medium to a corresponding polarization-insensitive receive assembly, such as to a corresponding one of the first receive assemblies 104 of FIG. 1, so as to communicate the dual carrier optical data signals 212, 224 to the first receive assemblies 104. In these and other embodiments, each of the dual carrier optical data signals 212, 224 may be communicated via a separate physical channel (e.g., one or more optical fibers, amplifiers, dispersion compensating elements, or the like).

Alternately, the dual carrier optical data signals 212, 224 may be multiplexed by a multiplexer (MUX) 226 into a multiplexed optical data signal 228 and communicated to the first receive assemblies 104 via a single physical channel. In these and other embodiments, each of the dual carrier optical data signals 212, 224 may have a bandwidth about equal to or less than a nominal channel spacing of the MUX 226. As used herein, the term "bandwidth" may refer to full width at half maximum (FWHM) unless context dictates otherwise.

In some embodiments, if the nominal channel spacing of the MUX 226 is 50 GHz, each of the dual carrier optical data signals 212, 224 may have a bandwidth of about 50 GHz or less. Moreover, the dual carrier optical data signal 212 may be offset from the dual carrier optical data signal 224 by about the nominal channel spacing of the MUX 226. In these and other embodiments, a spectral efficiency of each of the dual carrier optical data signals 212, 224 may be at least 1 bit per second per hertz (b/s/Hz).

With continued reference to FIG. 2, each of the first, second, third and fourth optical data signals 208, 210, 220, 222 may have a symbol rate s. The symbol rate s may be about 28 gigabauds per second (GBd/s), or other suitable symbol rate. Moreover, the nominal offset n may have a value greater than 0 and less than a value of the symbol rate s. For instance, for a symbol rate s of 28 GBd/s, the nominal offset n may be in a range from about 0 gigahertz (GHz) to about 28 GHz, or in a range from about 16 GHz to about 24 GHz. More generally, the nominal offset n may have a value in a range from about 50% to about 90% of the value of the symbol rate s.

Thus, some embodiments disclosed herein represent a significant departure from some systems in which, to avoid cross-talk, the frequency offset between optical data signals transmitted over a shared medium is typically equal to or greater than the symbol rate per optical data signal. In particular, the frequency spectrum of an optical data signal typically has a bandwidth about equal to the symbol rate of the optical data signal. When the center frequencies of two optical data signals are offset from each other by an amount less than the symbol rate, the frequency spectra may overlap such that the two optical data signals may interfere with each other. As such, some systems require that the center frequencies of two optical data signals transmitted over a shared medium be offset by an amount equal to or greater than the symbol rate. According to embodiments described herein, however, interference between two optical data signals separated by an offset less than the symbol rate may be suppressed by polarization interleaving the two optical data signals in combination with bandwidth efficient modulation, such as CML™ or duobinary modulation schemes.

Other systems may transmit two optical data signals centered at the same frequency over a shared medium by polarization interleaving the two optical data signals. Such systems implement polarization discrimination at the receiver to separate the two optical data signals from each other and allow conversion to electrical data signals. The polarization discrimination may be implemented with a coherent receiver on the digital level and/or with one or more polarization-dependent optical components. According to some embodiments described herein, however, two polarization interleaved optical data signals included in a dual carrier optical data signal may be separated at the receiver without regard to the polarization of the two optical data signals, thereby eliminating the components that implement polarization discrimination at the receiver, as well as their cost and/or power consumption. In particular, some embodiments described herein include a receiver with a polarization insensitive receive assembly configured to demultiplex a polarization interleaved dual carrier optical data signal into two optical data signals based on frequency.

Figure 3:
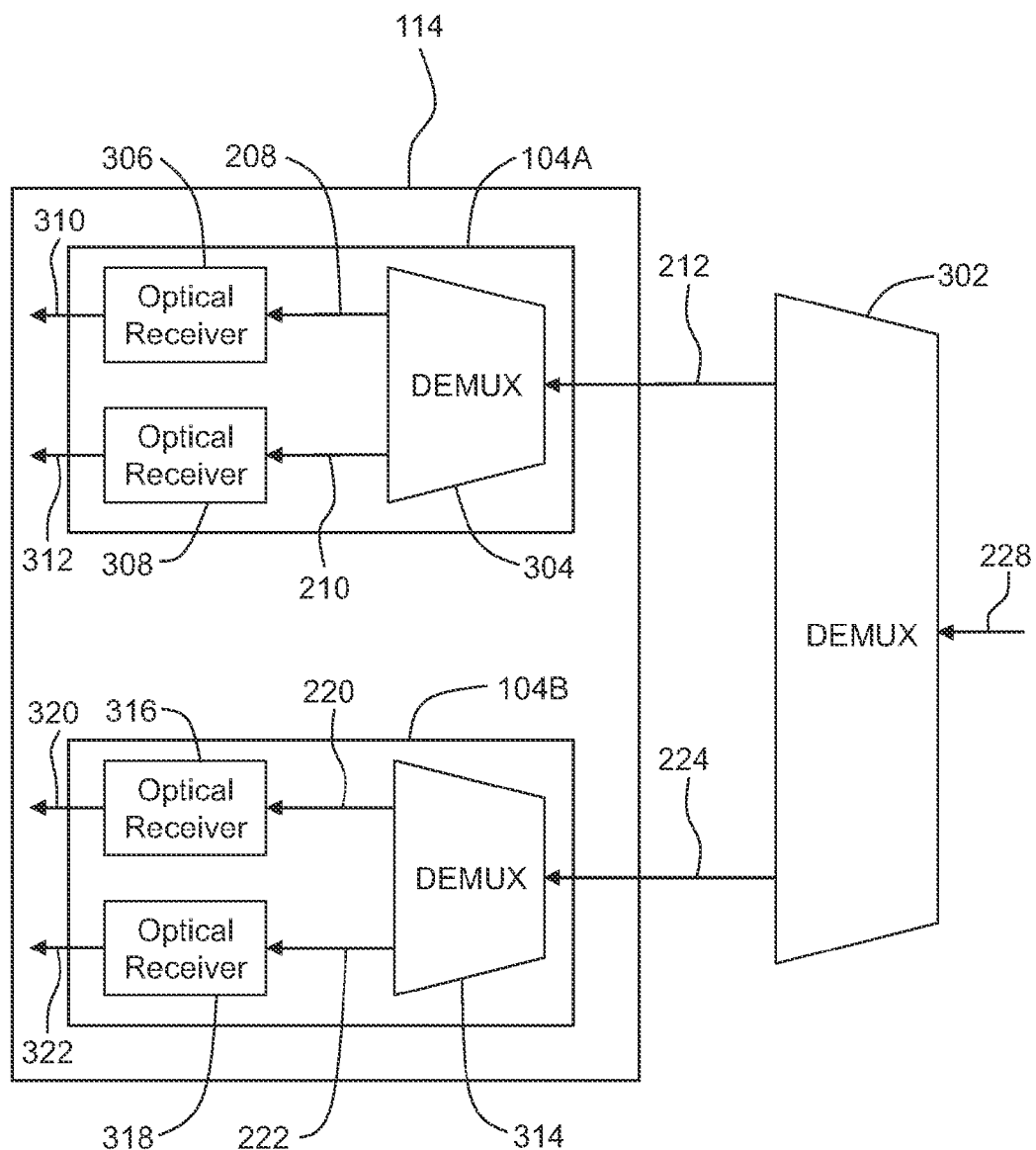
FIG. 3 illustrates an example embodiment of another optoelectronic module that may be implemented in the optical communication system of FIG. 1.

In particular, FIG. 3 illustrates an example embodiment of the second optoelectronic module 114. In the illustrated embodiment, the second optoelectronic module 112 includes receive assemblies 104A, 104B, corresponding to the one or more first receive assemblies 104 of FIG. 1.

Each of the receive assemblies 104A, 104B may be communicatively coupled to outputs of the PBCs 206, 218 of FIG. 2 to receive the dual carrier optical data signals 212, 224. For example, the receive assemblies 104A, 104B may be communicatively coupled to outputs of the PBCs 206, 218 via separate physical channels.

Alternately, in embodiments in which the dual carrier optical data signals 212, 224 are transmitted to the second optoelectronic module 114 as the multiplexed optical data signal 228, the receive assemblies 104A, 104B may be communicatively coupled to outputs of the PBCs 206, 218 via a single physical channel. In these and other embodiments, a demultiplexer (DEMUX) 302 may be provided to demultiplex the multiplexed optical data signal 228 into the dual carrier optical data signals 212, 224 that are respectively provided to the receive assemblies 104A, 104B.

The receive assembly 102A includes a polarization-insensitive DEMUX 304 and first and second optical receivers 306, 308. The DEMUX 304 may be configured to receive and demultiplex the polarization interleaved dual carrier optical data signal 212 into the first optical data signal 208 centered at the first frequency $f_1$ and the second optical data signal 210 centered at the second frequency $f_2$. In these and other embodiments, the DEMUX 304 demultiplexes the dual carrier optical data signal 212 based on frequency discrimination, as opposed to polarization discrimination. The first and second optical receivers 306, 308 are configured to receive the first and second optical data signals 208, 210 and to generate first and second electrical data signals 310, 312 respectively representing the first and second optical data signals 208, 210.

Similarly, the receive assembly 104B includes a polarization-insensitive DEMUX 314 and third and fourth optical receivers 316, 318. The DEMUX 314 may be configured to receive and demultiplex the polarization interleaved dual carrier optical data signal 224 into the third optical data signal 220 centered at the third frequency $f_3$ and the fourth optical data signal 222 centered at the fourth frequency $f_4$. In these and other embodiments, the DEMUX 314 demultiplexes the dual carrier optical data signal 224 based on frequency discrimination, as opposed to polarization discrimination. The third and fourth optical receivers 316, 318 are configured to receive the third and fourth optical data signals 220, 222 and to generate third and fourth electrical data signals 320, 322 respectively representing the first and second optical data signals 208, 210.

Each of the optical receivers 306, 308, 316, 318 may have any suitable configuration for converting optical data signals to electrical data signals. For instance, each of the optical receivers 306, 308, 316, 318 may include a positive-intrinsic-negative (PIN) photodiode and a transimpedance amplifier (TIA) communicatively coupled to the PIN photodiode. In these and other embodiments, each of the optical receivers 306, 308, 316, 318 may additionally include either a decision circuit communicatively coupled to the TIA, or a maximum likelihood sequence estimation (MLSE) processor communicatively coupled to the TIA.

Alternately, the receive assembly 104A may include a single, joint MLSE processor communicatively coupled to the TIA of the first optical receiver 306 and to the TIA of the second optical receiver 308. The receive assembly 104B may be similarly configured.

Alternately or additionally, each of the optical receivers 306, 308, 316, 318 may include an avalanche photodiode (APD) and a clock and data recovery circuit (CDR) communicatively coupled to the APD.

The foregoing described configurations of the optical receivers 306, 308, 316, 318 are provided by way of example only and are not exhaustive of the optical receiver configurations that may be within the scope of the claims.

Figure 4A:
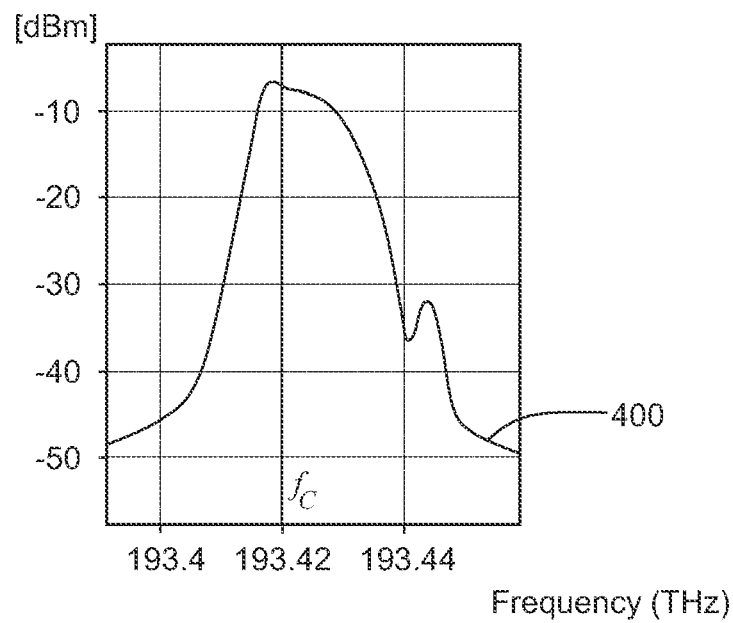
FIGS. 4A and 4B illustrate example simulated frequency spectra of various optical data signals.

FIG. 4A illustrates a simulated frequency spectrum 400 of a 28 GBd/s optical data signal. The simulated frequency spectrum 400 may represent the frequency spectrum of, for example, any of the optical data signals 208, 210, 220, 222 of FIG. 2. As illustrated in FIG. 4A, the simulated frequency spectrum 400 may be centered about a center frequency $f_C$, which may correspond to any of the frequencies $f_1$, $f_2$, $f_3$ or $f_4$ described above. Each of the optical transmitters 202, 204, 214, 216 may generate an optical data signal having a frequency spectrum similar to the simulated frequency spectrum 400 of FIG. 4A when implemented as an optical transmitter such as marketed by the FINISAR CORPORATION as a Chirp Managed Laser (CML™), a general overview of which is provided below.

Figure 4B:
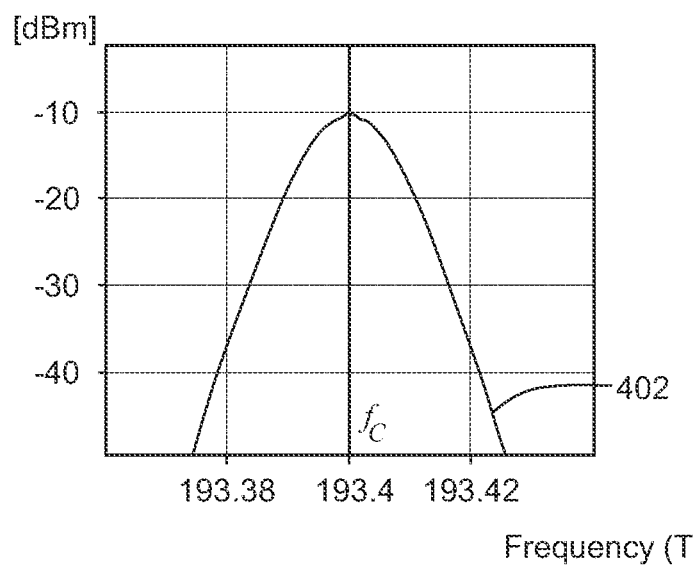

FIG. 4B illustrates another simulated frequency spectrum 402 of a 25 GBd/s optical data signal. The simulated frequency spectrum 402 may represent the frequency spectrum of, for example, any of the optical data signals 208, 210, 220, 222 of FIG. 2. Similar to the frequency spectrum 400 of FIG. 4A, the simulated frequency spectrum 402 of FIG. 4B may also be centered about a center frequency $f_C$, which may correspond to any of the frequencies $f_1$, $f_2$, $f_3$ or $f_4$ described above. Each of the optical transmitters 202, 204, 214, 216 may be implemented as an optical duobinary (ODB) transmitter to generate an optical data signal having a frequency spectrum similar to the simulated frequency spectrum 402 of FIG. 4B, for example.

Figure 5:
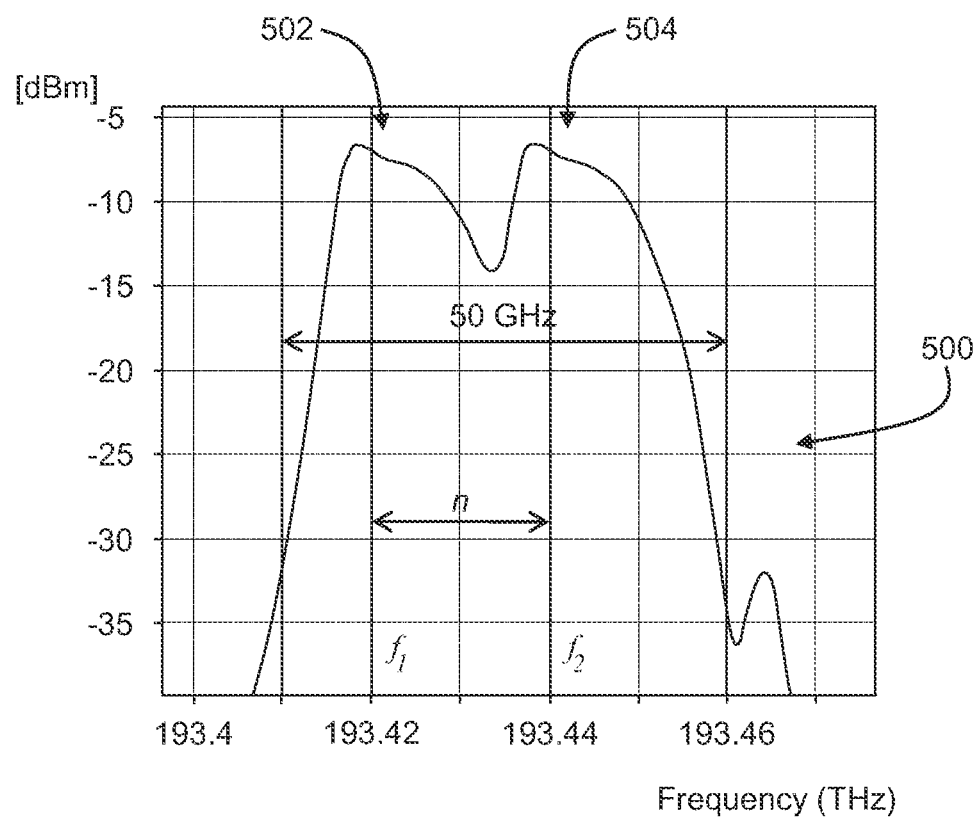
FIG. 5 illustrates an example simulated frequency spectrum of a polarization interleaved dual carrier optical data signal.

FIG. 5 illustrates an example simulated frequency spectrum 500 of a 56 GBd/s polarization interleaved dual carrier optical data signal. The simulated frequency spectrum 500 may represent the frequency spectrum of, for example, the dual carrier optical data signal 212 of FIGS. 2 and 3, including the first optical data signal 208 and the second optical data signal 210, or of the dual carrier optical data signal 224 of FIGS. 2 and 3. By way of example, the simulated frequency spectrum 500 may include a first sub-spectrum 502 generally corresponding to the first optical data signal 208 centered at the first frequency $f_1$ and a second sub-spectrum 504 generally corresponding to the second optical data signal 210 centered at the second frequency $f_2$.

In the illustrated embodiment, the first and second frequencies $f_1$ and $f_2$ are offset from each other by the frequency offset n. In particular, the frequency offset n is about 20 GHz in the example of FIG. 5. Accordingly, the value of the frequency offset n, which is 20 in this example, is only about 70% of the value of the symbol rate s, which is 28 in this example, of the individual first and second optical data signals 208, 210 making up the dual carrier optical data signal 212.

FIG. 5 further illustrates that the simulated frequency spectrum 500 of the 56 GBd/s polarization interleaved dual carrier optical data signal fits within a 50 GHz bandwidth such that the spectral efficiency of the 56 GBd/s polarization interleaved dual carrier optical data signal is at least about 1.12 b/s/Hz.

Figure 6:
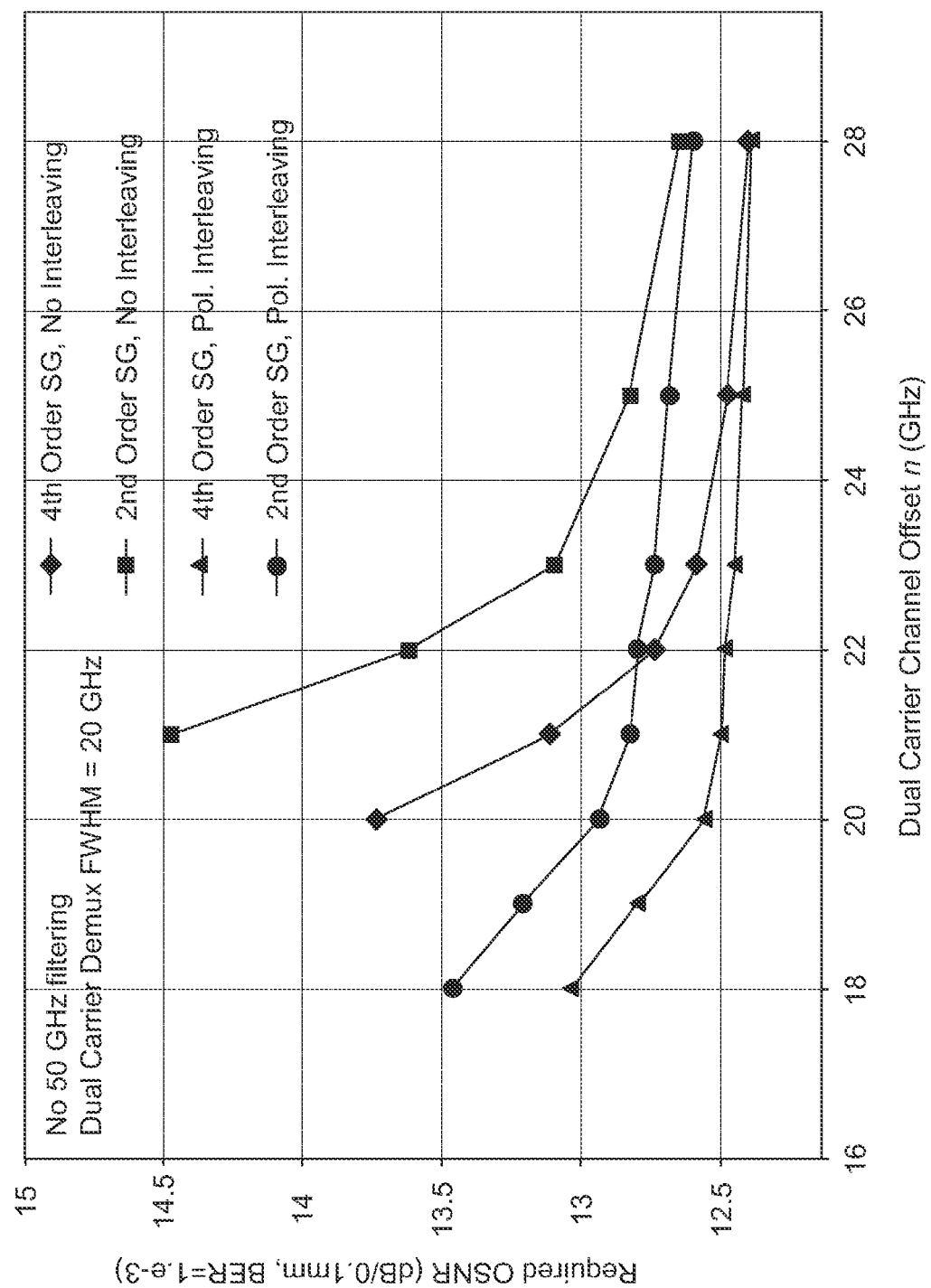
FIG. 6 illustrates an example simulated optical signal to noise ratio (OSNR) as a function of nominal offset n to obtain a desired bit error rate (BER)

FIG. 6 illustrates an example simulated optical signal to noise ratio (OSNR) as a function of nominal offset n to obtain a desired bit error rate (BER). In more detail, the simulations of FIG. 6 apply to a DEMUX, such as the DEMUX 304 or 314 of FIG. 3, modeled as a 2nd or 4th order super Gaussian (SG) filter with or without polarization interleaving, with a FWHM of 20 GHz, and for a dual carrier optical data signal made up of two optical data signals centered at frequencies offset by the nominal offset n, each having a symbol rate of about 28 GBd/s. As illustrated in FIG. 6, polarization interleaving results in a lower required OSNR with decreasing offset n compared to no polarization interleaving.

Figure 7:
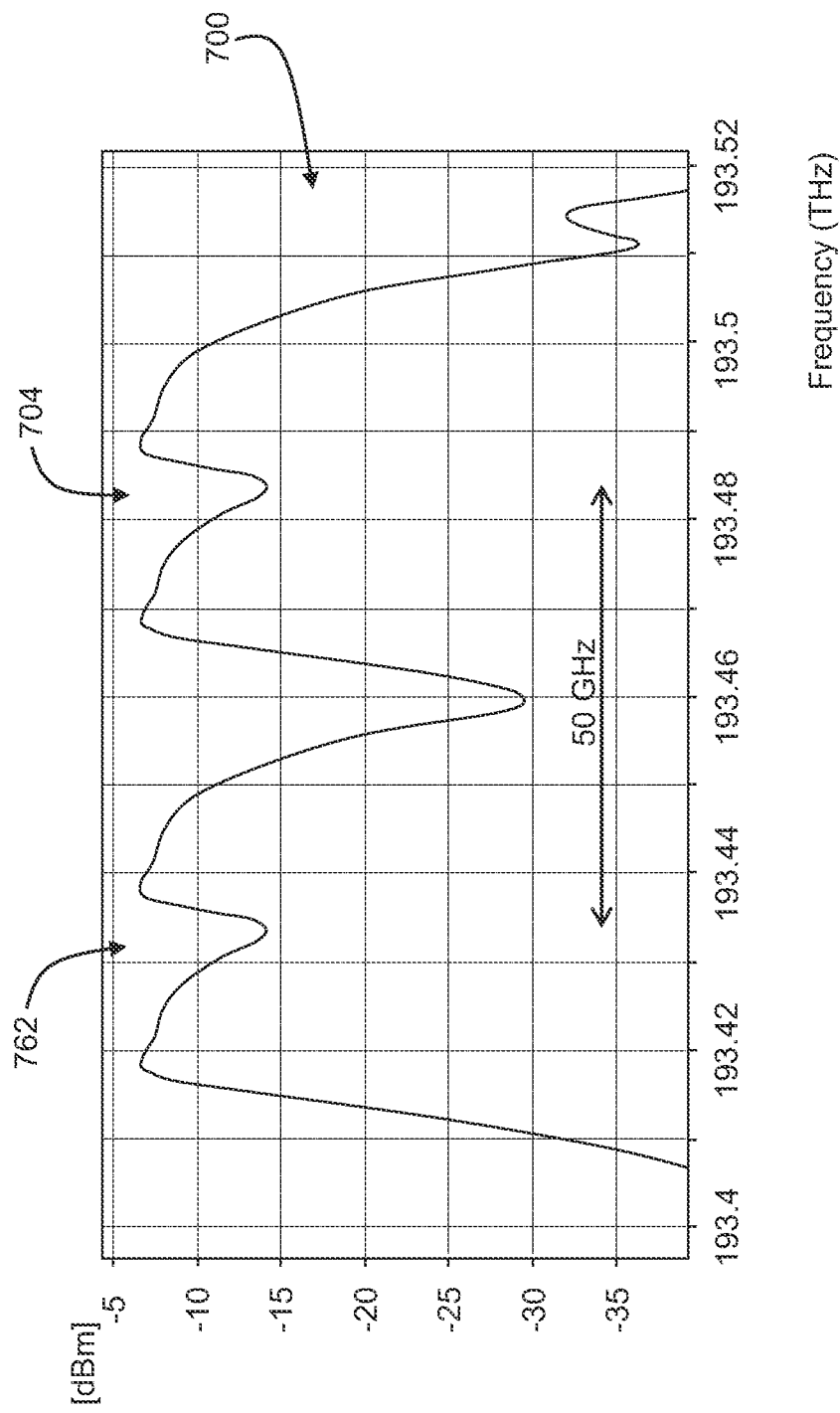
FIG. 7 illustrates an example simulated frequency spectrum of a multiplexed optical data signal.

FIG. 7 illustrates an example simulated frequency spectrum 700 of a 112 GBd/s multiplexed optical data signal. The simulated frequency spectrum 700 may represent the frequency spectrum of, for example, the multiplexed optical data signal 228 of FIGS. 2 and 3, including the two dual carrier optical data signals 212, 224 of FIGS. 2 and 3. By way of example, the simulated frequency spectrum 700 may include a first sub-spectrum 702 generally corresponding to the dual carrier optical data signal 212 and a second sub-spectrum 704 generally corresponding to the dual carrier optical data signal 224.

FIG. 7 further illustrates that the first and second sub-spectra 702, 704 are separated by about 50 GHz, which may correspond to the channel spacing of the MUX 226 and the DEMUX 302 of FIGS. 2 and 3, for example. More generally, the first and second sub-spectra 702, 704 may be separated by about the nominal channel spacing of the MUX 226 and the DEMUX 302 of FIGS. 2 and 3.

Figure 8:
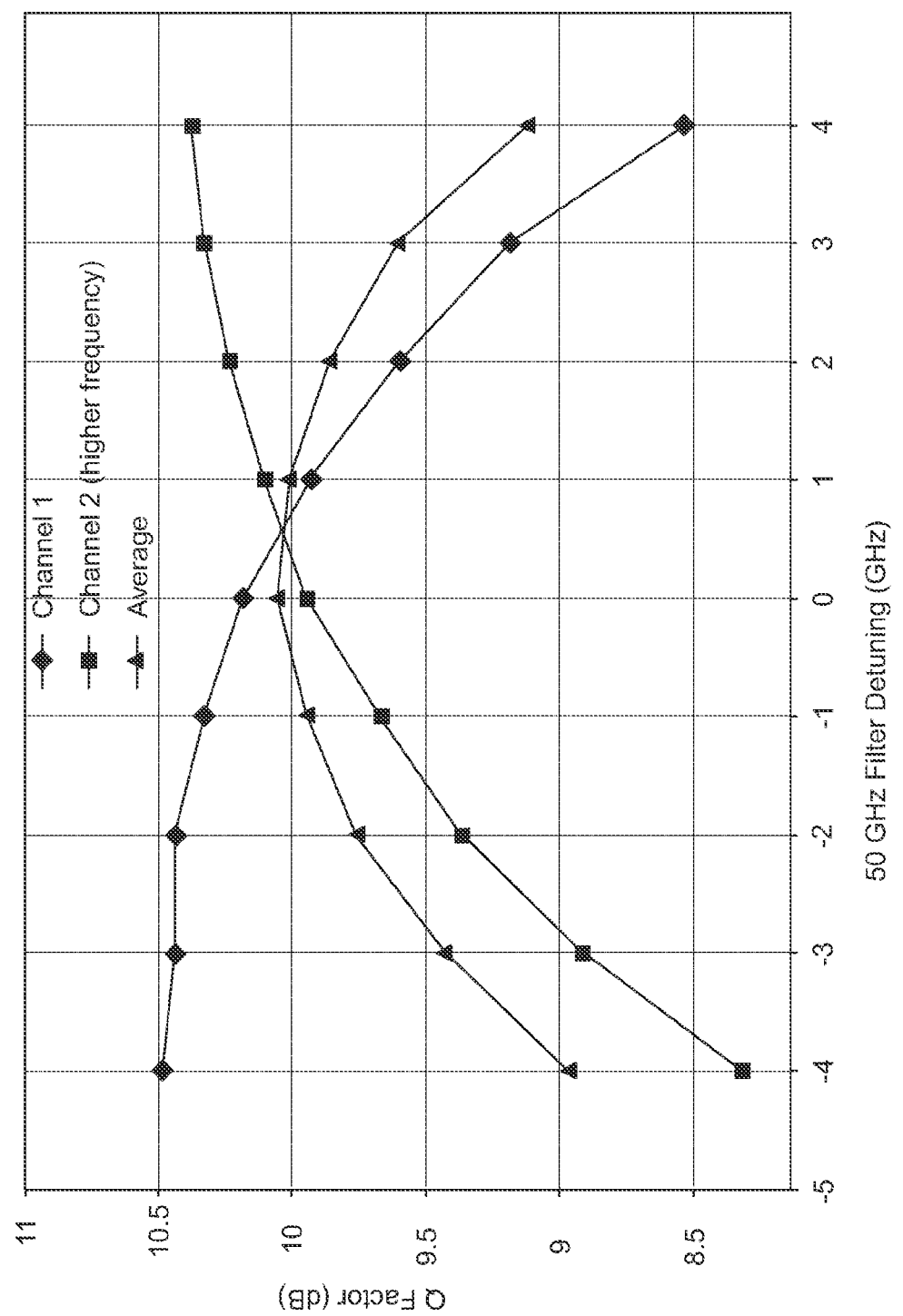
FIG. 8 graphically illustrates an example simulation of Q factor as a function of filter detuning.

FIG. 8 graphically illustrates an example simulation of the Q factor as a function of 50 GHz filter detuning. The 50 GHz filter may correspond to, for example, the MUX 226 and/or the DEMUX 302 of FIGS. 2 and 3. The simulation of FIG. 8 may apply to a dual carrier optical data signal made up of two optical data signals centered at frequencies offset by a nominal offset n of about 20 GHz, each having a symbol rate s of about 28 GBd/s. FIG. 8 and other Figures herein may refer to the two optical data signals making up the dual carrier optical data signal as "channels." Moreover, the dual carrier optical data signal may have a frequency spectrum with a 50 GHz or less bandwidth as described above with respect to FIG. 5. Whereas the MUX 226 and/or the DEMUX 302 may shift, or detune, from optimal settings by about ±2 GHz due to temperature fluctuations or the like, the simulation of FIG. 8 demonstrates that the penalty for detuning by ±2 GHz is less than about 1 dB, which may be tolerable in some applications.

Figure 9:
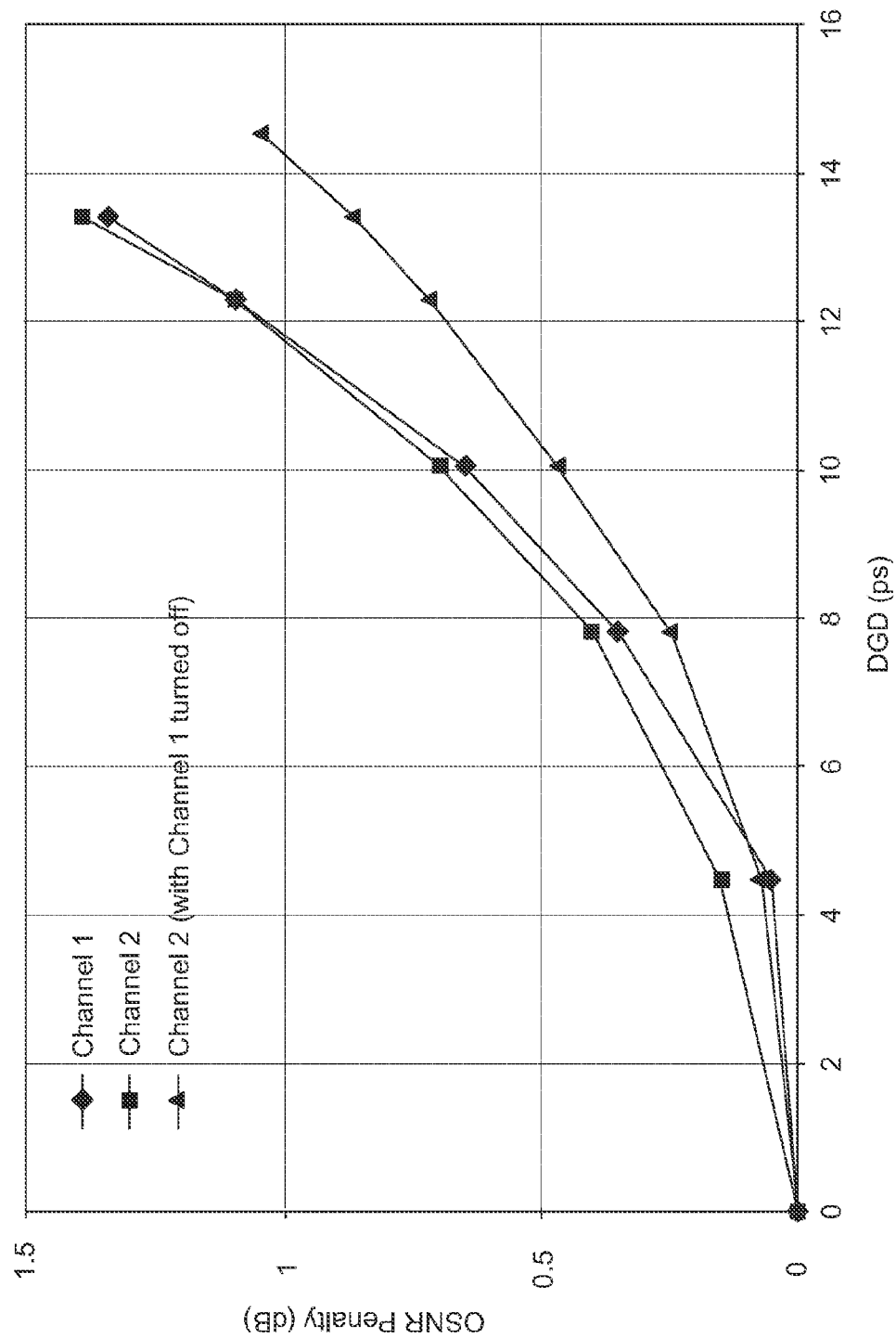
FIG. 9 graphically illustrates an example simulation of OSNR penalty as a function of differential group delay (DGD)

FIG. 9 graphically illustrates an example simulation of the OSNR penalty as a function of differential group delay (DGD). The simulation of FIG. 9 may apply to a dual carrier optical data signal made up of two optical data signals, or "channels," centered at frequencies offset by a nominal offset n of about 20 GHz, each having a symbol rate s of about 28 GBd/s. As illustrated in FIG. 9, the OSNR penalty at a DGD of more than 13 picoseconds (ps) is only about 1 dB more per optical data signal when polarization interleaved in a dual carrier optical data signal than for one of the optical data signals (e.g., channel 2) considered with the other optical data signal (e.g., channel 1) turned off.

As previously mentioned, each of the optical transmitters 202, 204, 214, 216 may be implemented as an optical transmitter such as marketed by the FINISAR CORPORATION as a CML™ optical transmitter. A general overview of aspects of an example CML™ optical transmitter which may be suitable for implementation as the optical transmitters 202, 204, 214, 216 are provided with respect to FIGS. 10-13C.

Figure 10:
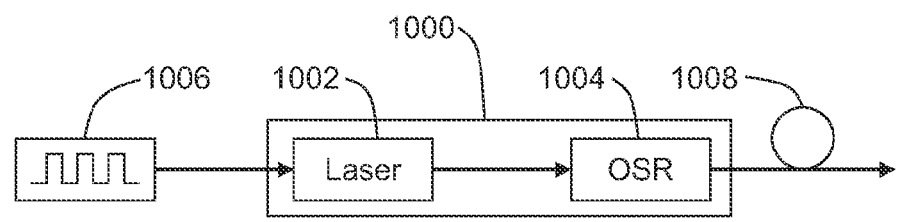
FIG. 10 is a schematic block diagram of an example optical transmitter including a laser and an optical spectrum reshaper (OSR)

FIG. 10 is a schematic block diagram of an example CML™ type optical transmitter 1000 including a laser 1002 and an optical spectrum reshaper (OSR) 1004. The laser 1002 emits a frequency modulated signal that is received by the OSR 1004. The frequency modulated signal encodes data from a data source 1006 electrically coupled to the laser 1002. The data source 1006 may include a laser driver, for example. The output of the OSR 1004 is coupled to an optical fiber 1008 such that an optical data signal exiting the OSR 1004 is coupled into the optical fiber 1008 for transmission to an optical receiver (not shown).

In some embodiments, the output of the laser 1002 is both frequency and amplitude modulated, such as adiabatically chirped pulses produced by a directly modulated laser 1002 embodied as a distributed feedback (DFB) laser, a distributed Bragg reflector (DBR) laser, or other semiconductor laser. The output of the OSR 1004 may also remain somewhat frequency modulated.

Figure 11:
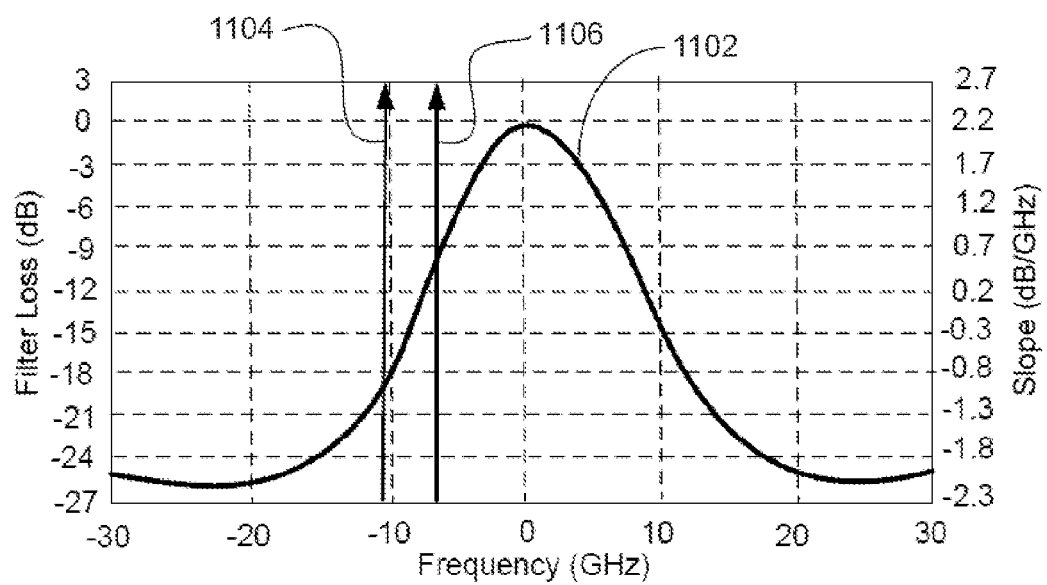
FIG. 11 graphically illustrates an example transmission function of the OSR of FIG. 10 relative to characteristic frequencies of a frequency modulated signal such as may be emitted by the laser of FIG. 10.

FIG. 11 graphically illustrates an example transmission function 1102 of the OSR 1004 of FIG. 10 relative to characteristic frequencies 1104, 1106 of a frequency modulated signal such as may be emitted by the laser 1002 of FIG. 10. In particular, the output of the laser 1002 may include low frequency portions and high frequency portions encoding binary zeros and ones, respectively. The low frequency portions and high frequency portions may define zero center frequency 1104 and one center frequency 1106, respectively. For purposes of this disclosure the zero frequency portion refers to portions of a signal having a center frequency equal to the zero center frequency 1104 (i.e. the frequency during a bit having the least optical energy) whereas the one frequency portions refer to portions of a signal having the one center frequency 1106.

In the illustrated embodiment, the one center frequency 1106 is located at a point on the transmission function 1102 of the OSR 1004 that has greater transmission than the location of the zero center frequency 1104. In some embodiments, this includes positioning the one center frequency 1106 and the zero center frequency 1104 on a positive slope portion of the transmission function 28.

In other embodiments, the zero center frequency 1104 may be located at a point on the transmission function 1102 of the OSR 1004 that has greater transmission than the location of the one center frequency 1106. Locating the zero center frequency 1104 at a point on the transmission function 1102 that has greater transmission than the one center frequency 1106 may include positioning the one center frequency 1106 and the zero center frequency 1104 on a negative slope portion of the transmission function 1102. In these and other embodiments, the bits in the optical data signal may be inverted such that the zero bits have energy while the one bits have relatively less or no energy.

With combined reference to FIGS. 10-11, the transmission function 1102 of the OSR 1004 may have a bandwidth in range between about 60% and about 120% of the symbol rate s of the optical data signal generated by the optical transmitter 1000, or in a range between about 70% and about 100% of the symbol rate s. Alternately, the bandwidth of the transmission function 1102 of the OSR 1004 may be less than about 60% or more than about 120% of the symbol rate s of the optical data signal.

Figure 12:
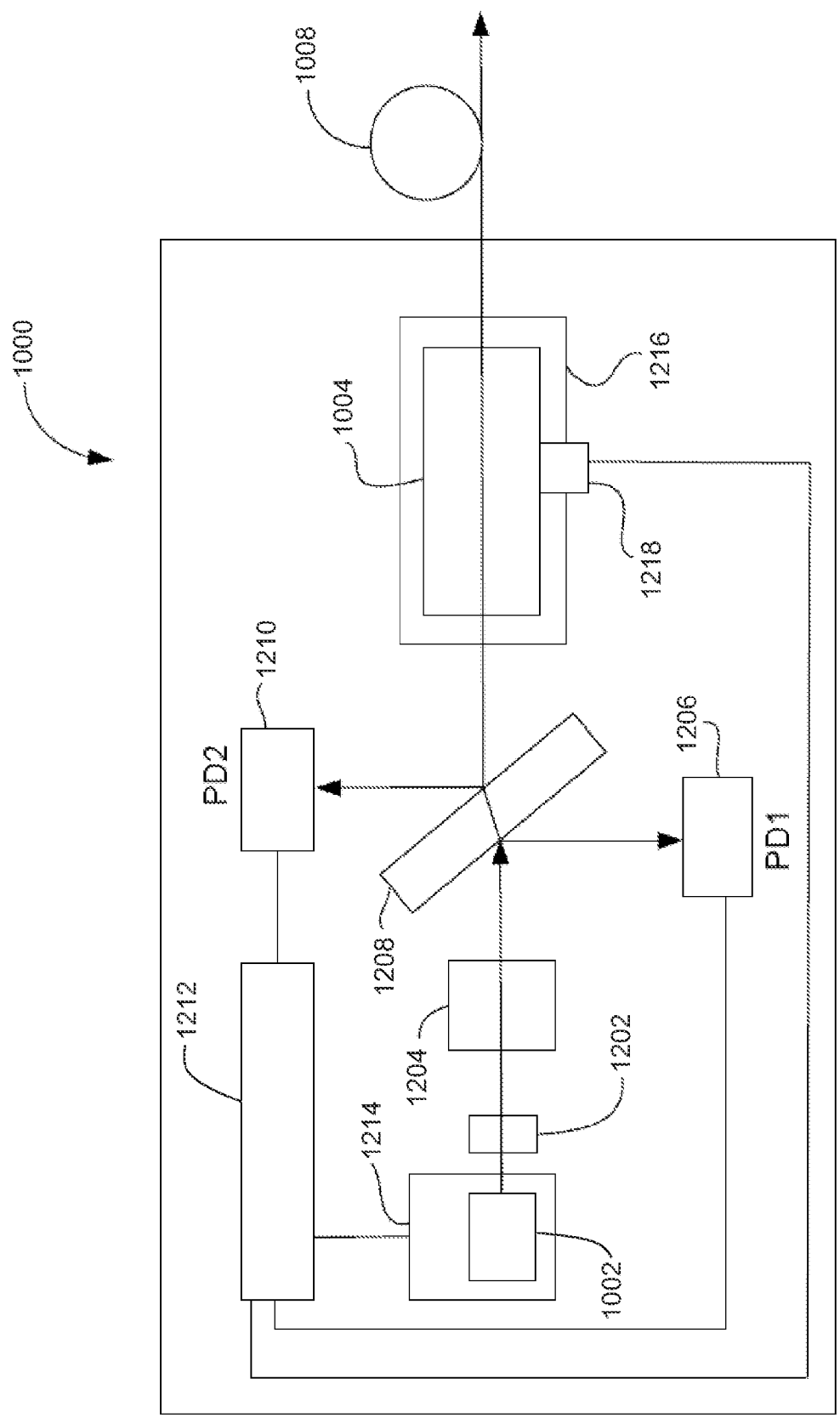
FIG. 12 is a schematic block diagram of an embodiment of the optical transmitter of FIG. 10.

FIG. 12 is a schematic block diagram of an embodiment of the optical transmitter 1000 of FIG. 10. In the illustrated embodiment, the OSR 1004 is located between the laser 1002 and the optical fiber 1008 and may be used to control the wavelength of the laser 1002. For example, a collimating lens 1202 is used to direct a collimated beam from the laser 1002 through an isolator 1204. A small fraction (typically 5%) of light from the laser 1002 is re-directed to a first photodetector (PD1) 1206 by a tap beam splitter 1208. The tap beam splitter 1208 may be produced by depositing an anti-reflection coating on one side of a small piece of polished glass and a second controlled-reflection coating on the opposite side.

In some embodiments, the portion of the collimated beam passing through the tap beam splitter 1208 is incident on the OSR 1004. The spectral response of the OSR 1004 may be such that non-transmitted light is reflected. Therefore, depending on the location of the lasing wavelength relative to the passband of the OSR 1004, a portion of the incident optical beam will be transmitted while a residual portion of the incident beam is reflected. The reflected portion of the beam passes back through the tap beam splitter 1208 and a portion of the power of the reflected portion, such as about 5%, is diverted onto a second photodetector (PD2) 1210, as shown in FIG. 12.

The frequency alignment between the laser 1002 and the OSR 1004 is generally implemented by a controller 1212 that compares the average optical power before and after the OSR 1004. For example, the ratio of photo currents produced by photodetectors 1206, 1210 may be used to "lock" the relative spectral positions of the laser 1002 with respect to the response of the OSR 1004. During calibration, the optimal set point for the laser wavelength relative to the OSR spectral response is determined. During operation, the controller 1212 then acts to maintain the laser wavelength near this calibrated set point by continuously adjusting the laser temperature via a thermoelectric cooler (TEC) 1214 to which the laser 1002 is coupled in response to the currents produced by the photodetectors 1206, 1210. For example, if the lasing wavelength changes, the ratio of the photo current signals provides an error signature allowing the controller 1212 coupled to the TEC 1214 to re-adjust the laser 1002 temperature to maintain the correct wavelength.

In some embodiments, the controller 1212 alternately or additionally controls the temperature of the OSR 1004 to avoid wavelength drift. For example, the temperature of the OSR 1004 may be held substantially constant by controlling power to a TEC 1216. The controller 1212 may receive an output from a temperature sensor 1218 in thermal contact with the OSR 1004 in order to control power to the TEC 1216 and maintain the OSR 1004 at a constant pre-calibrated temperature.

Figure 13A:
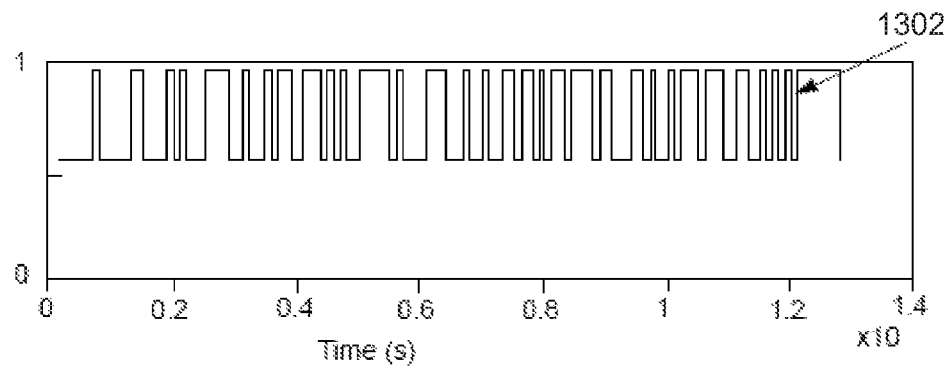
FIG. 13A illustrates an example amplitude modulation profile of an example optical signal such as may be emitted by the laser of FIG. 10.
Figure 13B:
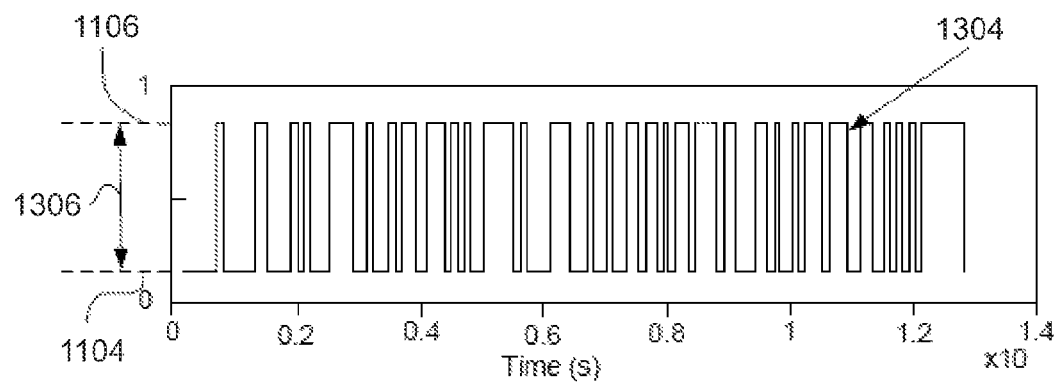
FIG. 13B depicts an example frequency modulation profile corresponding to the example optical signal of FIG. 13A.
Figure 13C:
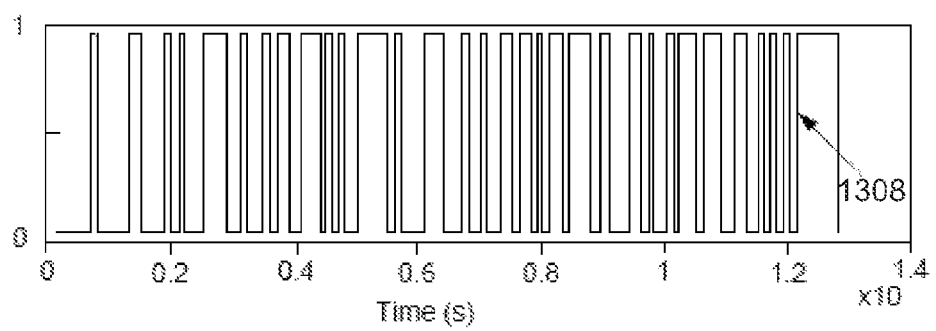
FIG. 13C illustrates an example enhanced amplitude modulation profile of the example optical signal of FIG. 13A after transmission through the OSR of FIG. 10.

FIG. 13A illustrates an example amplitude modulation profile of an example optical signal such as may be emitted by the laser 1002 of FIG. 10; FIG. 13B depicts an example frequency modulation profile corresponding to the example optical signal of FIG. 13A; and FIG. 13C illustrates an example enhanced amplitude modulation profile of the example optical signal of FIG. 13A after transmission through the OSR 1004 of FIG. 10.

With combined reference to FIGS. 10 and 13A-13C, in operation the data source 1006 modulates the laser 1002 to produce a frequency modulated signal having an amplitude modulation profile 1302 with a bit period T and a corresponding bit frequency 1/T. As shown in FIG. 13B, the frequency modulated signal may have a frequency modulation profile 1304 in which the frequency modulated signal is modulated between the zero center frequency 1104 and the one center frequency 1106. The difference between the zero center frequency 1104 and the one center frequency 1106 may be referred to as the frequency excursion 1306 of the frequency modulated signal. The frequency modulated signal is transmitted through the OSR 1004, which outputs an optical data signal having an enhanced amplitude modulation profile 1308 relative to the amplitude modulation profile 1302. For example, the amplitude modulation profile 1302 may have an extinction ratio of between 2 and 4 dB, whereas the amplitude modulation profile 1308 may have an extinction ratio of greater than 10 dB.

Returning to FIG. 5, the simulated frequency spectrum 500 for a 56 GBd/s dual carrier optical data signal may be generated in some embodiments by polarization interleaving two optical data signals individually generated by a CML™ type optical transmitter, such as described herein with respect to FIGS. 10-13C. In this example, the two optical data signals may be generated by aligning corresponding frequency modulated signals generated by corresponding lasers 1002, where the frequency modulated signals are offset from each other by the nominal offset n, to positive slope portions of corresponding OSR 1004 transmission functions 1102. Alternately, one of the frequency modulated signals may be aligned to a positive slope portion of the respective OSR 1004 transmission function 1102, while the other may be aligned to a negative slope portion of the respective OSR 1004 transmission function 1102.

Figure 14A:
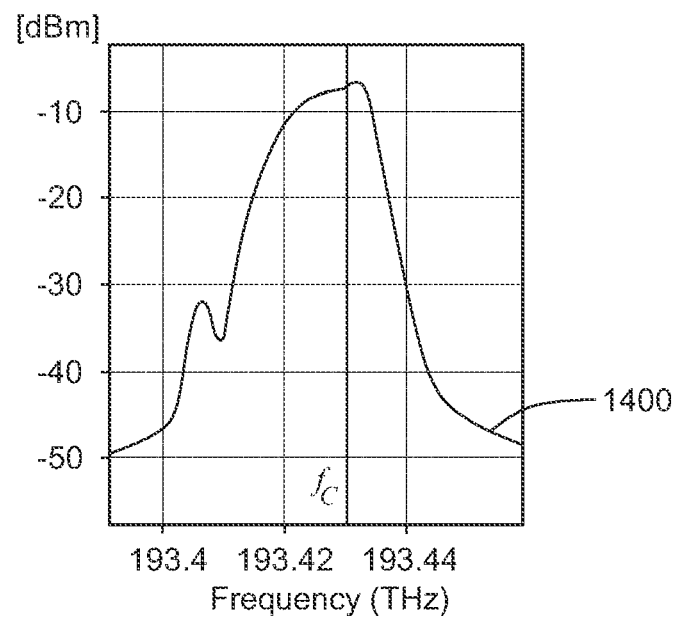
FIG. 14A illustrates an example simulated frequency spectrum analogous in some respects to the simulated frequency spectrum of FIG. 4A.

In particular, as illustrated in FIG. 4A, the simulated frequency spectrum 400 of an optical data signal such as may be output by a CML™ type optical transmitter is asymmetrical. The simulated frequency spectrum 400 of FIG. 4A may result from aligning the frequency modulated signal generated by the corresponding laser 1002 to a positive slope portion of a corresponding OSR 1004 transmission function 1102. However, the frequency spectrum may be flipped by aligning the frequency modulated signal generated by the corresponding laser 1002 to a negative slope portion of the corresponding OSR 1004 transmission function 1102. For example, FIG. 14A illustrates an example simulated frequency spectrum 1400 analogous to the simulated frequency spectrum 400 of FIG. 4A, except the frequency modulated signal generated by the laser 1002 is aligned to a negative slope portion of the corresponding OSR 1004 transmission function 1102.

Figure 14B:
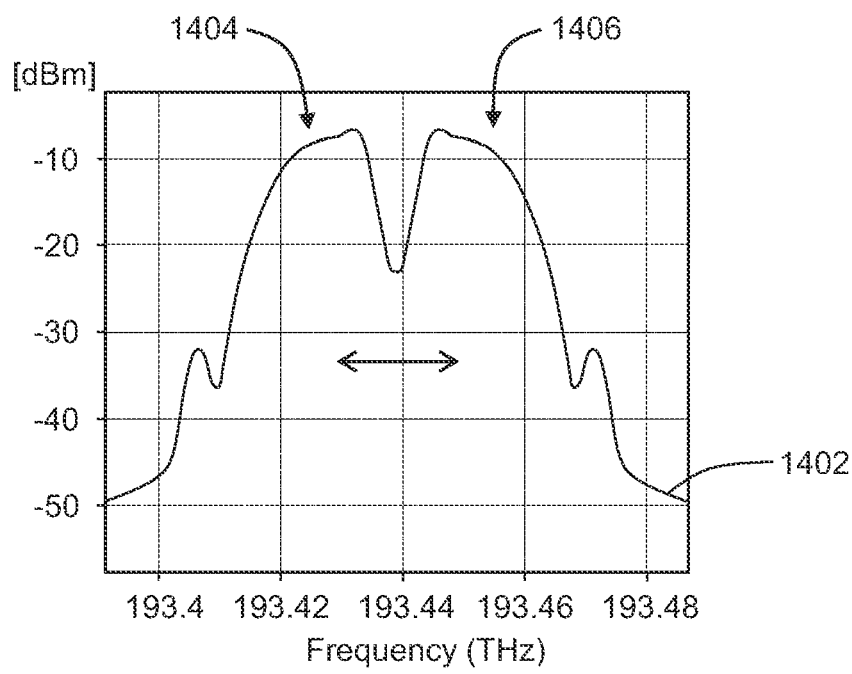
FIG. 14B illustrates an example simulated frequency spectrum of a polarization interleaved dual carrier optical data signal.

FIG. 14B illustrates an example simulated frequency spectrum 1402 of a 56 GBd/s polarization interleaved dual carrier optical data signal. The simulated frequency spectrum 1402 of FIG. 14B is analogous to the simulated frequency spectrum 500 of FIG. 5 and may be generated by polarization interleaving to optical data signals generated by CML™ type optical transmitters. In particular, the simulated frequency spectrum 1402 may include a first sub-spectrum 1404 generally corresponding to the optical data signal generated by a CML™ type optical transmitter 1000 with a laser 1002 emitting a frequency modulated signal aligned to a negative slope portion of the corresponding OSR 1004 transmission function 1102, and a second sub-spectrum 1406 generally corresponding to the optical data signal generated by a CML™ type optical transmitter 1000 with a laser 1002 emitting a frequency modulated signal aligned to a positive slope portion of the corresponding OSR 1004 transmission function 1102. By flipping the frequency spectrum of one of the optical data signals as described herein, the steep edges of the respective frequency spectrums may be positioned facing each other as depicted in FIG. 14B, which may further reduce interference between the optical data signals making up a polarization interleaved dual carrier optical data signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transmit assembly, comprising:
   a first optical transmitter configured to emit a first optical data signal centered at a first frequency;
   a second optical transmitter configured to emit a second optical data signal centered at a second frequency offset from the first frequency by a nominal offset n; and
   a polarizing beam combiner configured to generate a dual carrier optical data signal by polarization interleaving the first optical data signal with the second optical data signal;
   wherein:
      an output of the polarizing beam combiner is configured to be communicatively coupled via an optical transmission medium to a polarization-insensitive receive assembly;
      a spectral efficiency of the dual carrier optical data signal is at least 1 bit per second per hertz;
      the nominal offset n is less than a bit rate of the first or second optical data signal such that frequency spectrums of the first and second optical data signals overlap; and
      interference between the first and second optical data signals is suppressed by providing the first and second optical data signals with orthogonal polarizations.

2. The transmit assembly of claim 1, wherein each of the first and second optical data signals has a symbol rate of about 28 gigabauds per second.

3. The transmit assembly of claim 2, wherein a bandwidth of the dual carrier optical data signal is about 50 gigahertz or less.

4. The transmit assembly of claim 2, wherein the nominal offset n is between 16 gigahertz and 24 gigahertz.

5. The transmit assembly of claim 1, wherein the optical transmission medium is devoid of dispersion compensating elements.

6. The transmit assembly of claim 1, wherein:
   the first optical transmitter comprises:
      a first directly modulated laser coupled to a first digital data source and configured to output a first frequency modulated signal encoding an output of the first digital data source; and
      a first optical spectrum reshaper positioned to receive the first frequency modulated signal and having a frequency dependent transmission function effective to convert the first frequency modulated signal into the first optical data signal, wherein the first optical data signal has enhanced amplitude modulation relative to the first frequency modulated signal; and
   the second optical transmitter comprises:
      a second directly modulated laser coupled to a second digital data source and configured to output a second frequency modulated signal encoding an output of the second digital data source; and
      a second optical spectrum reshaper positioned to receive the second frequency modulated signal and having a frequency dependent transmission function effective to convert the second frequency modulated signal into the second optical data signal, wherein the second optical data signal has enhanced amplitude modulation relative to the second frequency modulated signal.

7. The transmit assembly of claim 6, wherein a bandwidth of each of the first and second optical spectrum reshapers is in a range between 70% and 100% of a bit rate of the corresponding first or second optical data signal.

8. The transmit assembly of claim 6, wherein:
   the first frequency is less than the second frequency;
   the first directly modulated laser is aligned to a transmission edge of the first optical spectrum reshaper having a negative slope; and
   the second directly modulated laser is aligned to a transmission edge of the second optical spectrum reshaper having a positive slope.

9. The transmit assembly of claim 1, wherein:
   the first optical transmitter comprises a first optical duobinary transmitter; and
   the second optical transmitter comprises a second optical duobinary transmitter.

10. A receive assembly, comprising:
    a polarization-insensitive demultiplexer configured to receive and demultiplex a polarization interleaved dual carrier optical data signal into a first optical data signal centered at a first frequency and a second optical data signal centered at a second frequency offset from the first frequency by a nominal offset n;
    a first optical receiver configured to receive the first optical data signal and to generate a first electrical data signal representing the first optical data signal; and
    a second optical receiver configured to receive the second optical data signal and to generate a second electrical data signal representing the second optical data signal,
    wherein:
       the first optical data signal and the second optical data signal are both amplitude modulated; and
       the nominal offset n is less than a bit rate of the amplitude modulated first or second optical data signal such that frequency spectrums of the amplitude modulated first and second optical data signals overlap.

11. The receive assembly of claim 10, wherein:
    the first optical receiver comprises:
       a first PIN photodiode; and
       a first transimpedance amplifier communicatively coupled to the first PIN photodiode; and
    the second optical receiver comprises:
       a second PIN photodiode; and
       a second transimpedance amplifier communicatively coupled to the second PIN photodiode.

12. The receive assembly of claim 11, wherein:
    the first optical receiver further comprises at least one of:

a first decision circuit communicatively coupled to the first transimpedance amplifier; or a first maximum likelihood sequence estimation (MLSE) processor communicatively coupled to the first transimpedance amplifier; and the second optical receiver further comprises at least one of:

a second decision circuit communicatively coupled to the second transimpedance amplifier; or a second MLSE processor communicatively coupled to the second transimpedance amplifier.

13. The receive assembly of claim 11, further comprising a joint maximum likelihood sequence estimation (MLSE) processor communicatively coupled to each of the first and second transimpedance amplifiers.

14. The receive assembly of claim 10, wherein each of the first and second optical data signals has a symbol rate of about 28 gigabauds per second.

15. The receive assembly of claim 14, wherein a bandwidth of the dual carrier optical data signal is about 50 gigahertz or less.

16. The receive assembly of claim 14, wherein the nominal offset n is between 16 gigahertz and 24 gigahertz.

17. The receive assembly of claim 10, wherein a spectral efficiency of the dual carrier optical data signal is at least 1 bit per second per hertz.

18. An optoelectronic module comprising:

a transmit assembly configured to generate a first dual carrier optical data signal comprising a first optical data signal centered at a first frequency and a second optical data signal centered at a second frequency offset from the first frequency by a nominal offset n, the first optical data signal being polarization interleaved with the second optical data signal; and a polarization-insensitive receive assembly configured to receive and demultiplex, without performing polarization demultiplexing, a second dual carrier optical data signal comprising a third optical data signal polarization interleaved with a fourth optical data signal, wherein:

the first dual carrier optical data signal is configured to be communicatively coupled via an optical transmission medium to a remote polarization-insensitive receive assembly that is remote from the optoelectronic module; and the nominal offset n is less than a bit rate of the first or second optical data signal such that frequency spectrums of the first and second optical data signals overlap.

19. The optoelectronic module of claim 18, wherein the transmit assembly comprises:

a first optical transmitter configured to emit the first optical data signal;

a second optical transmitter configured to emit the second optical data signal; and a polarizing beam combiner configured to generate the first dual carrier optical data signal by polarization interleaving the first optical data signal with the second optical data signal.

20. The optoelectronic module of claim 18, wherein the polarization-insensitive receive assembly comprises:

a polarization-insensitive demultiplexer configured to receive and demultiplex the second dual carrier optical data signal into the third optical data signal and the fourth optical data signal;

a first optical receiver configured to receive the third optical data signal and to generate a first electrical data signal representing the third optical data signal; and a second optical receiver configured to receive the fourth optical data signal and to generate a second electrical data signal representing the fourth optical data signal.

21. The optoelectronic module of claim 18, wherein the optoelectronic module comprises at least two transmit assemblies and at least two receive assemblies.

22. The optoelectronic module of claim 18, wherein the optoelectronic module is compliant with a C form-factor pluggable (CFP) multi-source agreement (MSA).

23. A method comprising:

generating a first optical data signal centered at a first frequency;

generating a second optical data signal centered at a second frequency offset from the first frequency by a nominal offset n;

polarization multiplexing the first optical data signal with the second optical data signal to generate a dual carrier optical data signal with a spectral efficiency of at least 1 bit per second per hertz; and coupling the dual carrier optical data signal onto an optical transmission medium communicatively coupled to a polarization insensitive receive assembly configured to demultiplex the dual carrier optical data signal without performing polarization demultiplexing;

wherein the nominal offset n is less than a bit rate of the first or second optical data signal such that frequency spectrums of the first and second optical data signals overlap.

24. A method comprising:

receiving a polarization interleaved dual carrier optical data signal;

demultiplexing, without performing polarization demultiplexing, the dual carrier optical data signal into an amplitude modulated first optical data signal centered at a first frequency and an amplitude modulated second optical data signal centered at a second frequency offset from the first frequency by a nominal offset n;

generating a first electrical data signal representing the first optical data signal; and generating a second electrical data signal representing the second optical data signal, wherein the nominal offset n is less than a bit rate of the amplitude modulated first or second optical data signal such that frequency spectrums of the amplitude modulated first and second optical data signals overlap.

* * * * *